United States Patent
Belinski-Wolfe et al.

(10) Patent No.: US 7,291,291 B2
(45) Date of Patent: *Nov. 6, 2007

(54) ELECTROLUMINESCENT PHOSPHOR POWDER WITH D50 VALUE OF LESS THAN 12 µM AND METHOD OF MAKING

(75) Inventors: Judy A. Belinski-Wolfe, Towanda, PA (US); Thomas A. Wolfe, Towanda, PA (US); Brian J. Payne, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 275 days.

This patent is subject to a terminal disclaimer.

(21) Appl. No.: 10/907,360

(22) Filed: Mar. 30, 2005

(65) Prior Publication Data

US 2006/0220547 A1  Oct. 5, 2006

(51) Int. Cl.
*C09K 11/56* (2006.01)
*C09K 11/54* (2006.01)
(52) U.S. Cl. .............................. 252/301.6 S; 313/503
(58) Field of Classification Search ......... 252/301.6 S; 313/503
See application file for complete search history.

(56) References Cited

U.S. PATENT DOCUMENTS

| | | | |
|---|---|---|---|
| 4,859,361 A | 8/1989 | Reilly et al. | 252/301.6 S |
| 5,009,808 A | 4/1991 | Reilly et al. | 252/301.6 S |
| 5,220,243 A | 6/1993 | Klinedinst et al. | 313/502 |
| 5,244,750 A | 9/1993 | Reilly et al. | 428/690 |
| 5,525,313 A | 6/1996 | Kawano et al. | |
| 5,643,496 A | 7/1997 | Brese et al. | 252/301.65 |
| 5,702,643 A | 12/1997 | Reddy et al. | 252/301.65 |
| 6,064,150 A | 5/2000 | Klinedinst et al. | 313/503 |
| 6,090,311 A | 7/2000 | Brese et al. | 252/301.65 |
| 6,248,261 B1 | 6/2001 | Takemura et al. | 252/301.6 S |
| 6,309,700 B1 | 10/2001 | Fan et al. | 427/213 |
| 6,702,958 B2 * | 3/2004 | Takehara et al. | 313/504 |
| 7,067,071 B1 * | 6/2006 | Kappe et al. | 252/301.6 S |
| 2002/0113226 A1 | 8/2002 | Takehara et al. | |
| 2006/0071587 A1 | 4/2006 | Yamaguchi et al. | |
| 2006/0230980 A1 | 10/2006 | Kappe et al. | |

FOREIGN PATENT DOCUMENTS

| | | | |
|---|---|---|---|
| DE | 887 094 | | 8/1953 |
| EP | 1 215 263 A2 | | 6/2002 |
| EP | 1 367 113 A2 | | 12/2003 |
| JP | 09- 13029 | * | 1/1997 |
| WO | WO 91/16722 | | 10/1991 |
| WO | WO 01/34723 | * | 5/2001 |
| WO | WO 01/34723 A1 | | 5/2001 |
| WO | WO 2004/031322 A1 | | 4/2004 |

OTHER PUBLICATIONS

U.S. Appl. No. 10/907,358, filed Mar. 30, 2005 to Chen et al.

* cited by examiner

Primary Examiner—C. Melissa Koslow
(74) Attorney, Agent, or Firm—Robert F. Clark

(57) ABSTRACT

There is presented an electroluminescent phosphor powder of copper-activated zinc sulfide particles that has a size distribution with a D50 value of less than 12 µm, and more preferably less than 10 µm. The powder is preferably made by a method that includes the steps of combining copper-doped zinc sulfide with sulfur, zinc oxide and a chloride-containing flux to form a first mixture; preliminarily firing the first mixture and milling the preliminarily fired first mixture to form a milled material having a D50 value of less than or equal to about 5 µm; blending the milled material with sulfur, zinc oxide and a chloride-containing flux to form a second mixture; firing the mixture in a first firing step at a temperature in a range of about 1020° C. to about 1080° C. to form a hexagonal zinc sulfide material; inducing defects into the hexagonal zinc sulfide material; firing the hexagonal zinc sulfide material in a second firing step at a temperature in a range of about 650° C. to about 850° C. to form an electroluminescent phosphor; and sifting the electroluminescent phosphor to provide an electroluminescent phosphor powder comprising phosphor particles that have a size distribution with a D50 value of less than 12 µm. The step of inducing defects may be accomplished by milling, mulling or sonification of the mixture.

14 Claims, 1 Drawing Sheet

ELECTROLUMINESCENT PHOSPHOR POWDER WITH D50 VALUE OF LESS THAN 12 μM AND METHOD OF MAKING

BACKGROUND OF THE INVENTION

This invention relates to zinc sulfide-based electroluminescent phosphors. More specifically, it relates to small-size ZnS:Cu-based blue, blue-green, green and orange electroluminescent phosphors.

There are many uses for electroluminescent (EL) phosphors which have been incorporated into thick film electroluminescent devices. Most commonly, these phosphors have been used for backlighting liquid crystal displays (LCD), automotive dashboard and control switch illumination, emergency egress lighting and mobile phone keypad applications. These phosphors are based on copper-activated zinc sulfide (ZnS:Cu) and may be blue, blue-green, green or orange emitting.

A cross-sectional illustration of a conventional thick-film EL lamp is shown in FIG. 1. The lamp 2 has two dielectric layers 20 and 22. A first conductive material 4, such as aluminum or graphite, coated on a plastic film 12b forms a first electrode of the lamp 2; while a thin layer of a transparent conductive material 6, such as indium tin oxide, coated on a second plastic film 12a forms a second electrode. Sandwiched between the two conductive electrodes 4 and 6 are two layers 20 and 22 of dielectric material 14 which can be, for example, cyanoethyl cellulose or cyanoethyl starch. Adjacent to the first electrode 4 is a layer of dielectric material 14 in which are embedded particles of a ferroelectric material 10, preferably barium titanate. Adjacent to the second electrode 6 is a layer of dielectric material 14 in which are embedded particles of an electroluminescent phosphor 8. The phosphors available for thick-film EL lamps are primarily comprised of zinc sulfide that has been doped with various activators, e.g., Cu, Au, Ag, Mn, Br, I, and Cl. Examples of these phosphors are described in U.S. Pat. Nos. 5,009,808, 5,702,643, 6,090,311, and 5,643,496. Typically, the individual particles of the EL phosphors are encapsulated with an inorganic coating in order improve their resistance to moisture-induced degradation. Examples of such coatings are described in U.S. Pat. Nos. 5,220,243, 5,244,750, 6,309,700, and 6,064,150.

U.S. Pat. No. 4,859,361 to Reilly et al. and International Application No. WO 91/16722 to Faria, describe the process employed in making copper-activated zinc sulfide phosphor particles. First, the phosphor precursor materials, ZnS, a copper source, sulfur, and a chloride flux, are blended and fired to form a hexagonal ZnS material containing copper and chloride ions. Next, the hexagonal ZnS is subjected to low intensity mechanical stresses (by milling and/or mulling) to induce defects into the particles. The stressed material is blended with zinc oxide and copper sulfate and refired at a lower temperature to form an electroluminescent phosphor that has a primarily cubic structure.

There are many characteristics that are commercially desirable, such as brightness, color, and lifetime. Particle size has become an important consideration in the application of these phosphors. As mentioned in the U.S. Pat. No. 5,643,496 to Brese et al., fabrication techniques such as screen printing require smaller particle sizes for thinner phosphor layers. In addition, there has been an interest in using these phosphors in paint or spray-type coatings. Previously, small particle size material has been obtained by controlling the first-step firing time and temperature and/or by screening. However, these processes have low yields.

Thus, it would be advantageous to be able to produce a ZnS:Cu-based EL phosphor that has an average particle size less than 12 micrometers (μm) in diameter and maintains reasonable brightness characteristics. It would also be advantageous to be able to produce these phosphors with higher yields.

SUMMARY OF THE INVENTION

Accordingly, an object of the present invention is to provide a novel method of making an electroluminescent phosphor powder of copper-activated zinc sulfide particles that has a size distribution with a D50 value of less than 12 μm, and more preferably less than 10 μm. The phosphor particles may further contain chlorine, manganese or both. As used herein, the particle size is in reference to a cumulative volume fraction (%), in particular, the D50 value is the particle size at which the cumulative volume of particles reaches 50%.

A further object is to provide a novel method that includes the steps of combining copper-doped zinc sulfide with sulfur, zinc oxide and a chloride-containing flux to form a first mixture; preliminarily firing the first mixture and milling the preliminarily fired first mixture to form a milled material having a D50 value of less than or equal to about 5 μm; blending the milled material with sulfur, zinc oxide and a chloride-containing flux to form a second mixture; firing the mixture in a first firing step at a temperature in a range of about 1020° C. to about 1080° C. to form a hexagonal zinc sulfide material; inducing defects into the hexagonal zinc sulfide material; firing the hexagonal zinc sulfide material in a second firing step at a temperature in a range of about 650° C. to about 850° C. to form an electroluminescent phosphor; and sifting the electroluminescent phosphor to provide an electroluminescent phosphor powder comprising phosphor particles that have a size distribution with a D50 value of less than 12 μm. The step of inducing defects may be accomplished by milling, mulling or sonification of the mixture.

These and other objects and advantages of the invention will be apparent to those of skill in the art of the present invention after consideration of the following description of preferred embodiments.

DETAILED DESCRIPTION OF INVENTION

Figure 1:
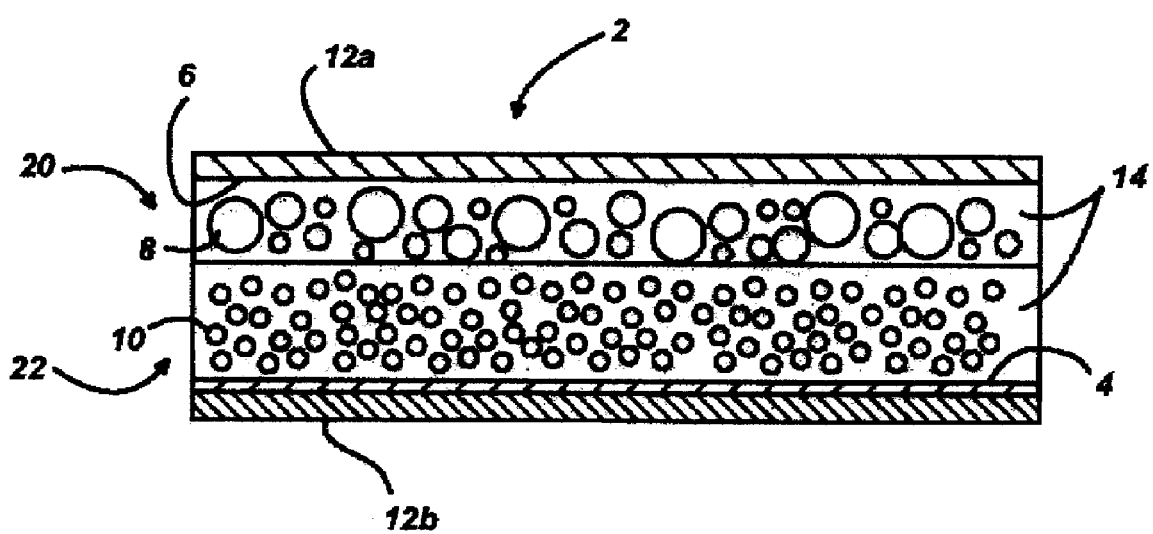
FIG. 1 is a cross-sectional illustration of a conventional thick-film EL lamp.

In a preferred embodiment, the method of making an electroluminescent phosphor powder that is described in more detail below includes the steps of combining copper-doped zinc sulfide with sulfur, zinc oxide and a chloride-containing flux to form a mixture, preliminarily firing the mixture in air at a temperature from about 1020° C. to 1100° C. for about 65 to about 85 minutes and milling the preliminarily fired mixture to a D50 value of less than or equal to about 5 μm, blending again with sulfur, zinc oxide and a chloride-containing flux, firing the milled and re-blended mixture at a temperature in a range of about 1020° C. to about 1080° C. for about 35 to about 45 minutes to form a hexagonal zinc sulfide material, inducing defects into the hexagonal zinc sulfide material, blending the hexagonal zinc sulfide material with zinc oxide and copper sulfate, firing the mulled mixture at a temperature in a range of about 650° C. to about 850° C. for about 25 minutes to about 3.5 hours to form an electroluminescent phosphor, and sifting the phosphor to provide an electroluminescent phosphor powder comprising phosphor particles that have a size distribution with a D50 value of less than 12 μm. The inducing step is accomplished by applying mechanical stress to the hexagonal zinc sulfide material including by means of milling, mulling or sonification.

In a preferred embodiment, the electroluminescent phosphor is comprised of a zinc sulfide activated with copper and chlorine. Preferably, the phosphor contains from about 0.03 to about 0.90 weight percent (wt. %) copper and about 0.002 to 0.1 wt. % chlorine. Both chlorinated and unchlorinated ZnS can be used as a starting material in this process.

More particularly, the preferred method includes doping a ZnS powder with a copper compound, such as $CuSO_4$, in aqueous solution, mixing well and drying in a oven for at least 48 hours. This homogenous mixture is then blended with the appropriate amounts of ZnO, S, and a chloride-containing flux. The chloride-containing flux may be a mixture of alkali metal and alkaline earth chlorides, preferably containing $MgCl_2$ along with one or more of the following: KCl, LiCl, $BaCl_2$, NaCl, $CaCl_2$, or $SrCl_2$. Preferably, the blend will contain 7 wt. % magnesium chloride and 1 wt. % potassium chloride.

The blended mixture may be fired in the air at a temperature from about 1020° C. to about 1100° C. for about 65 to about 85 minutes. After quick cooling to room temperature (e.g., to less than about 100° C. in less than about 1 hour), accomplished by blowing compressed air directly on the crucible, the powder is water washed to remove the fluxes. The powder is then chemically washed using HCl, then NaOH, diethylenetriaminepentaacetic acid (DTPA) and $H_2O_2$. After drying, the powder is sifted to break up any lumps. This material is then wet milled to yield a particle size distribution with D50 value of ≦5 micrometers. It is then filtered, dried and resifted.

After the preliminary firing, the milled material is then blended again with ZnO, S, and a chloride-containing flux. In this embodiment, the blend preferably contains 7.2 wt. % magnesium chloride and 0.8 wt. % barium chloride. The mixture is fired in a first step at about 1020° C. to about 1080° C. for about 35 to about 45 minutes. After quick cooling to room temperature, the powder is water washed to remove the fluxes. The powder is dried and sifted.

The material is then mulled (low-intensity milling) for about 75 to about 430 minutes depending on the equipment used and the amount of material.

After mulling, the powder is then chemically washed with acid followed by NaOH, DTPA and $H_2O_2$. The material is then water washed to remove the residual chemicals and dried. This completes the first-step firing.

In the second-step firing, the mulled material is blended with 10-20 wt. % zinc oxide and 0.1-1 wt. % anhydrous copper sulfate and then fired in the air for about 25 minutes to 3.5 hours at 650 to 850° C. The crucible is allowed to cool slowly in the furnace over a period of two hours to about 400° C. (e.g., about 2-4° C./min). The cake is then cooled to room temperature outside of the furnace. The powder is water washed and then chemically washed using HCl, then NaOH, DTPA and $H_2O_2$. The powder is finished by washing with water to remove any chemical residue and dried. The powder is sifted to an appropriate size, preferably −635 mesh.

EXAMPLES

Nine examples of blue-green emitting phosphor powders are given below. All phosphors were tested in conventional thick-film electroluminescent lamps operated at 100 V and 400 Hz in a 50% R.H, 70° F. environment. The test lamps are comprised of an ~40 μm-thick phosphor layer and an approximately 26 μm-thick barium titanate dielectric layer. The lamps are constructed by combining the phosphor with a cyanoresin binder (Shin Etsu Co.) which has been dissolved in a mixture of acetone and dimethylformamide. In particular, the binder is made by mixing 575 g of acetone, 575 g of dimethylformamide, and 400 g of cyanoresin. The percentage of phosphor in the liquid binder is 50 wt. % and the percentage of phosphor after the binder-phosphor mix is dried is 79.5 wt. %. The phosphor suspension is blade coated onto a 0.0065-0.0075 in.-thick PET film having a transparent, conductive layer of indium-tin oxide (ITO) (OC-200 available from CPFilms). After drying, the barium titanate layer is applied over the phosphor layer in the same way using a suspension of barium titanate dispersed in the cyanoresin binder. In particular, the binder barium-titanate mix is made by mixing 375 g of liquid cyanoresin binder, 375 g of barium titanate, and 82.5 g of dimethylformamide. The percentage of barium titanate in the binder after drying is 79.5 wt. %. A rear electrode comprised of a 40 to 60 μm thick graphite layer is applied to the dried barium titanate dielectric layer using a graphite suspension (423 SS from Acheson Colloids). Lead wires are attached and the entire lamp is laminated with clear, flexible film (Aclam TC200 from Honeywell Corp.) which is applied to both sides. The lamps were operated for 24 hours prior to measuring their brightness in order to stabilize the lamps and obtain representative measurements. Brightness as used herein means the brightness of the phosphor in a conventional thick-film electroluminescent lamp, which has been operated at 100 V and 400 Hz for 24 hours. Brightness values are given in footlamberts (fL). Preferably, brightness is at least about 10 fL, more preferably at least about 15 fL, and even more preferably at least 25 fL.

Example 1

1.24 grams of anhydrous $CuSO_4$ was dissolved in a minimal amount of hot deionized (DI) water and added to 550.0 grams of unchlorinated ZnS and blended well to form a slurry. The slurry was dried at a temperature of 110° C. for 48 hours. Thereafter, this mixture was blended together with flux materials consisting of 7% $MgCl_2$, 1% KCl, and 8% S, and 0.5% ZnO by weight. The blend was placed in covered crucibles and preliminarily fired in a furnace at about 1085° C. for about 75 minutes. The fired cakes were taken out of the furnace, and cooled quickly with compressed air. The preliminarily fired material was washed with hot DI water, HCl and with a solution of DTPA-NaOH-$H_2O_2$ (4 wt. % DTPA, 3.8 wt. % NaOH, 3 wt. % $H_2O_2$ (30% solution). After four DI water washes, the material was dried at 110° C. for 12 hours then sifted through a 100-mesh screen.

400.0 grams of the preliminarily fired material was wet milled in an attritor mill for 70 minutes using 5 mm YTZ media. The milled powder was filtered and dried for 12 hours at 110° C. It was then sifted through a 100-mesh brass screen to break up any agglomerates. The D50 value for the milled material was between 3 to 4 μm.

470.0 grams of the milled material was then blended with flux materials, 7.2 wt. % $MgCl_2$ and 0.8 wt. % $BaCl_2$, and 8 wt. % S, and 0.5 wt. % ZnO. The blend was placed in covered crucibles and fired in a first step in a furnace at about 1050° C. for about 40 minutes. The fired cakes were taken out of the furnace, and cooled quickly with compressed air. The fired material was washed several times with hot deionized (DI) water and dried at 110° C. for 12 hours. This material was then mulled for 125 minutes and then sifted through a 325-mesh screen. The powder was then washed with hot HCl (pH 0.7-0.9). Several water washes were applied until the pH of the water wash was >4. The powder again was washed chemically with a solution of DTPA-NaOH-$H_2O_2$ (4 wt. % DTPA, 3.8 wt. % NaOH, 3 wt. % $H_2O_2$ (30% solution)). After four DI water washes, the material was dried at 110° C. for 12 hours then sifted through a 100-mesh screen.

To the mulled, first-step fired material was added 0.4% anhydrous $CuSO_4$ and 10% ZnO by weight and the combined material was re-blended. The re-blended materials were placed in covered crucibles and fired in a second step at about 730° C. for about 2¼ hours.

This second-step fired material was washed twice with water, twice with hydrochloric acid, and then several times with hot DI water until the wash solution had a pH below 4. It was then washed with a solution of DTPA-NaOH-$H_2O_2$ (4 wt. % DTPA, 3.8 wt. % NaOH, 3 wt. % $H_2O_2$ (30% solution)). It was further washed with DI water to remove residual chemicals. The second-step fired material was then filtered, dried and sifted through a 635-mesh stainless steel sieve to form a finished phosphor.

As shown in the Table, all of the phosphors of the present invention have a particle size distribution with a D50 value of <12 micrometers. Moreover, a number of the Examples have a D50 value in the range from about 5 μm to about 10 μm.

Example 2

This sample was made similarly to Example 1 except that it was first-step fired for 25 minutes (instead of 40 minutes).

Example 3

This sample was made similarly to Example 1 except: (1) the flux mixture was 2.8 wt. % $MgCl_2$ and 5.2 wt. % $BaCl_2$ (instead of 7.2 wt. % $MgCl_2$ and 0.8 wt. % $BaCl_2$), and (2) the first-step firing time was 25 minutes (instead of 40 minutes).

Example 4

This sample was made similarly to Example 1 except: (1) the preliminarily fired powder was milled for 90 minutes (instead of 70 minutes), and (2) the first-step firing time was 25 minutes (instead of 40 minutes).

Example 5

This sample was made similarly to Example 1 except the preliminarily fired powder was milled for 90 minutes (instead of 70 minutes).

Example 6

This sample was made similarly to sample 1 except: (1) the preliminarily fired powder was milled for 90 minutes (instead of 70 minutes), (2) the flux used in the first-step firing was 7.2 wt. % $LiCl_2$ and 0.8 wt. % $BaCl_2$ (instead of 7.2 wt. % $MgCl_2$ and 0.8 wt. % $BaCl_2$), and (3) the first-step firing time was 35 minutes (instead of 40 minutes).

Example 7

This sample was made similarly to Example 1 except: (1) the preliminarily fired powder was milled for 90 minutes (instead of 70 minutes), and (2) the flux used in the first-step firing was 7.2 wt. % $LiCl_2$ and 0.8 wt. % $BaCl_2$ (instead of 7.2 wt. % $MgCl_2$ and 0.8 wt. % $BaCl_2$).

Example 8

This sample was made similarly to Example 1 except: (1) this sample was made by direct firing (no preliminary firing or milling step to reduce the particle size), and (2) sonification was used to induce the defects.

Example 9

This sample was made similarly to Example 1 except: (1) this sample was made by direct firing using 7.8 wt. % $MgCl_2$ and 5.2 wt. % $BaCl_2$ (instead of 7.2 wt. % $MgCl_2$ and 0.8 wt. % $BaCl_2$) for the flux (no preliminary firing or milling step to reduce the particle size), and (2) sonification was used to induce the defects.

| Example | D50 (μm) | 24 hour Brightness (fL) | X Color Coordinate | Y Color Coordinate |
| --- | --- | --- | --- | --- |
| Example 1 | 11.07 | 27.7 | 0.166 | 0.429 |
| Example 2 | 6.65 | 14.7 | 0.161 | 0.395 |
| Example 3 | 6.69 | 9.0 | 0.170 | 0.384 |
| Example 4 | 10.65 | 14.3 | 0.164 | 0.431 |
| Example 5 | 10.34 | 19.9 | 0.168 | 0.441 |
| Example 6 | 10.65 | 3.2 | 0.163 | 0.250 |
| Example 7 | 11.44 | 4.5 | 0.166 | 0.285 |
| Example 8 | 7.5 | 12.5 | 0.178 | 0.448 |
| Example 9 | 6.91 | 12.9 | 0.178 | 0.458 |

While embodiments of the present invention have been described in the foregoing specification, it is to be understood that the present invention is defined by the following claims when read in light of the specification and the drawing.

What is claimed is:

1. A method of making an electroluminescent phosphor powder comprising the steps of:
   combining copper-doped zinc sulfide with sulfur, zinc oxide and a chloride-containing flux to form a first mixture;
   preliminarily firing the first mixture and milling the preliminarily fired first mixture to form a milled material having a D50 value of less than or equal to about 5 μm;
   blending the milled material with sulfur, zinc oxide and a chloride-containing flux to form a second mixture;
   firing the mixture in a first firing step at a temperature in a range of about 1020° C. to about 1080° C. to form a hexagonal zinc sulfide material;
   inducing defects into the hexagonal zinc sulfide material;
   firing the hexagonal zinc sulfide material in a second firing step at a temperature in a range of about 650° C. to about 850° C. to form an electroluminescent phosphor; and sifting the electroluminescent phosphor to provide an electroluminescent phosphor powder comprising phosphor particles that have a size distribution with a D50 value of less than 12 μm.

2. The method of claim 1, wherein the step of inducing defects includes sonification of the mixture.

3. The method of claim 1, wherein the first mixture is preliminarily fired at a temperature in a range of about 1020° C. to about 1100° C. for about 65 minutes to about 85 minutes.

4. The method of claim 3, wherein the preliminary firing is at a temperature of about 1085° C. for about 75 minutes.

5. The method of claim 1, wherein the first step firing is at a temperature of about 1050° C. for about 40 minutes.

6. The method of claim 1, wherein the second step firing is at a temperature of about 730° C. for about 2¼ hours.

7. The method of claim 5, wherein the second step firing is at a temperature of about 730° C. for about 2¼ hours.

8. An electroluminescent phosphor powder comprising particles of a copper-activated zinc sulfide electroluminescent phosphor having a particle size distribution having a D50 value of less than 12 μm, wherein the powder when operated at 100V and 400 Hz in an electroluminescent lamp has a brightness of at least about 10 fL.

9. The electroluminescent phosphor powder of claim 8, wherein the brightness is at least about 15 fL.

10. The electroluminescent phosphor powder of claim 8, wherein the brightness is at least about 25 fL.

11. An electroluminescent lamp, comprising: a first electrode, a second electrode, a first dielectric layer containing a dielectric material, and a second dielectric layer containing an electroluminescent phosphor, the dielectric layers being located between the first and second electrodes and the phosphor comprising copper-activated zinc sulfide particles that have a size distribution with a D50 value of less than 12 μm, wherein the lamp when operated at 100V and 400 Hz has a brightness of at least about 10 fL.

12. The electroluminescent lamp of claim 11, wherein the brightness is at least about 15 fL.

13. The electroluminescent lamp of claim 11, wherein the brightness is at least about 25 fL.

14. The electroluminescent phosphor powder of claim 8, wherein the phosphor particles further contain chlorine, manganese or both.

* * * * *